United States Patent
Hama et al.

(10) Patent No.: US 6,799,655 B2
(45) Date of Patent: Oct. 5, 2004

(54) ELECTRIC POWER STEERING APPARATUS

(75) Inventors: Yohei Hama, Tochigi (JP); Akira Fujisaki, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/639,856

(22) Filed: Aug. 13, 2003

(65) Prior Publication Data

US 2004/0163880 A1 Aug. 26, 2004

(30) Foreign Application Priority Data

Feb. 21, 2003 (JP) ........................................ 2003-045002

(51) Int. Cl.⁷ ................................................. B62D 5/04
(52) U.S. Cl. ..................................... 180/444; 310/239
(58) Field of Search ................................. 180/443, 444, 180/446; 310/238, 239

(56) References Cited

U.S. PATENT DOCUMENTS 3,341,113 A * 9/1967 Sebok et al. ................ 417/368
4,166,968 A * 9/1979 Prittie ........................ 310/239
2002/0175573 A1 * 11/2002 Hayashi ....................... 310/54
2003/0102767 A1 * 6/2003 Adachi ....................... 310/239

FOREIGN PATENT DOCUMENTS

JP          315652         11/2001

* cited by examiner

Primary Examiner—Kevin Hurley
(74) Attorney, Agent, or Firm—Orum & Roth

(57) ABSTRACT

In an electric power steering apparatus in which a brush holder of an electric motor is clamped between a yoke of the electric motor and a housing, and a communication passage allowing an inner portion of the yoke of the electric motor and an inner portion of the housing to be ventilated is provided in a partition wall of the brush holder, shielding opposing each other via a narrow passage are provided in an opening facing the inner portion of the yoke in the communication passage provided in the brush holder.

10 Claims, 7 Drawing Sheets

ELECTRIC POWER STEERING APPARATUS

BACKGROUND OF THE INVENTION

1. Field of the Invention

The present invention relates to an electric power steering apparatus.

2. Description of the Related Art

An electric power steering apparatus is structured, as described in Japanese Patent Application Laid-Open No. 2001-315652 (patent document 1), such that a yoke of an electric motor is fixed to a housing, an assist shaft of a steering apparatus is supported to the housing, and the assist shaft is connected to a rotation shaft of the electric motor. A rotation force of the electric motor is transmitted to the steering apparatus, thereby assisting steering force applied to the steering shaft by a driver of a vehicle.

In the conventional electric power steering apparatus, a brush holder of the electric motor is clamped between the yoke of the electric motor and the housing, and a communication passage allowing ventilation between an inner portion of the yoke in the electric motor and an inner portion of the housing is provided in a partition wall. Therefore, when the temperature of an internal space of the yoke in the electric motor changes in correspondence to heating or cooling of the electric motor as a result of operation of the electric power steering apparatus, the internal air is transmitted between the inner space of the yoke and the inner portion of the housing. This prevents an ambient air containing moisture from intruding into the inner portion of the yoke so as to generate a dew condensation where internal air of the yoke in the electric motor is transmitted between the inner space of the yoke and the external portion of the apparatus.

The prior art has the following problems.

(1) There is a risk that grease applied to a periphery of the assist shaft in the inner portion of the housing is scattered at a time of operating the electric power steering apparatus in which the electric motor is assembled in the housing. Such scattered grease intrudes into the inner portion of the yoke of the electric motor from the communication passage provided in the partition wall, thereby causing a malfunction of the electric motor.

(2) There is a risk that in a preliminary stage before assembling the electric motor in the housing, dust in the ambient air intrudes into the inner portion of the yoke of the electric motor from the communication passage provided in the partition wall, thereby causing a malfunction of the electric motor.

SUMMARY OF THE INVENTION

An object of the present invention is to prevent foreign materials from making an intrusion into an inner portion of the electric motor, in an electric power steering apparatus in which a communication passage allowing ventilation between an inner portion of a yoke of the electric motor and an inner portion of a housing is provided in a partition wall of a brush holder.

The present invention relates to an electric power steering apparatus comprising a yoke of an electric motor fixed to a housing, an assist shaft of a steering apparatus supported to the housing, where the assist shaft is connected to a rotation shaft of the electric motor. A brush holder of the electric motor is clamped between the yoke of the electric motor and the housing. A communication passage is present allowing an inner portion of the yoke in the electric motor and an inner portion of the housing to be ventilated, the communication passage being provided in a partition wall of the brush holder.

Shielding means opposing each other are disposed in an opening facing the inner portion in a side of the yoke in the communication passage arranged in the brush holder, via a narrow passage.

BRIEF DESCRIPTION OF THE DRAWINGS

The present invention will be more fully understood from the detailed description given below and from the accompanying drawings which should not be taken to be a limitation on the invention, but are for explanation and understanding only. The drawings:

FIGS. 5A to 5C show a brush holder, in which

FIGS. 6A to 6C show a magnet holder, in which

DESCRIPTION OF THE PREFERRED EMBODIMENTS

Figure 1:
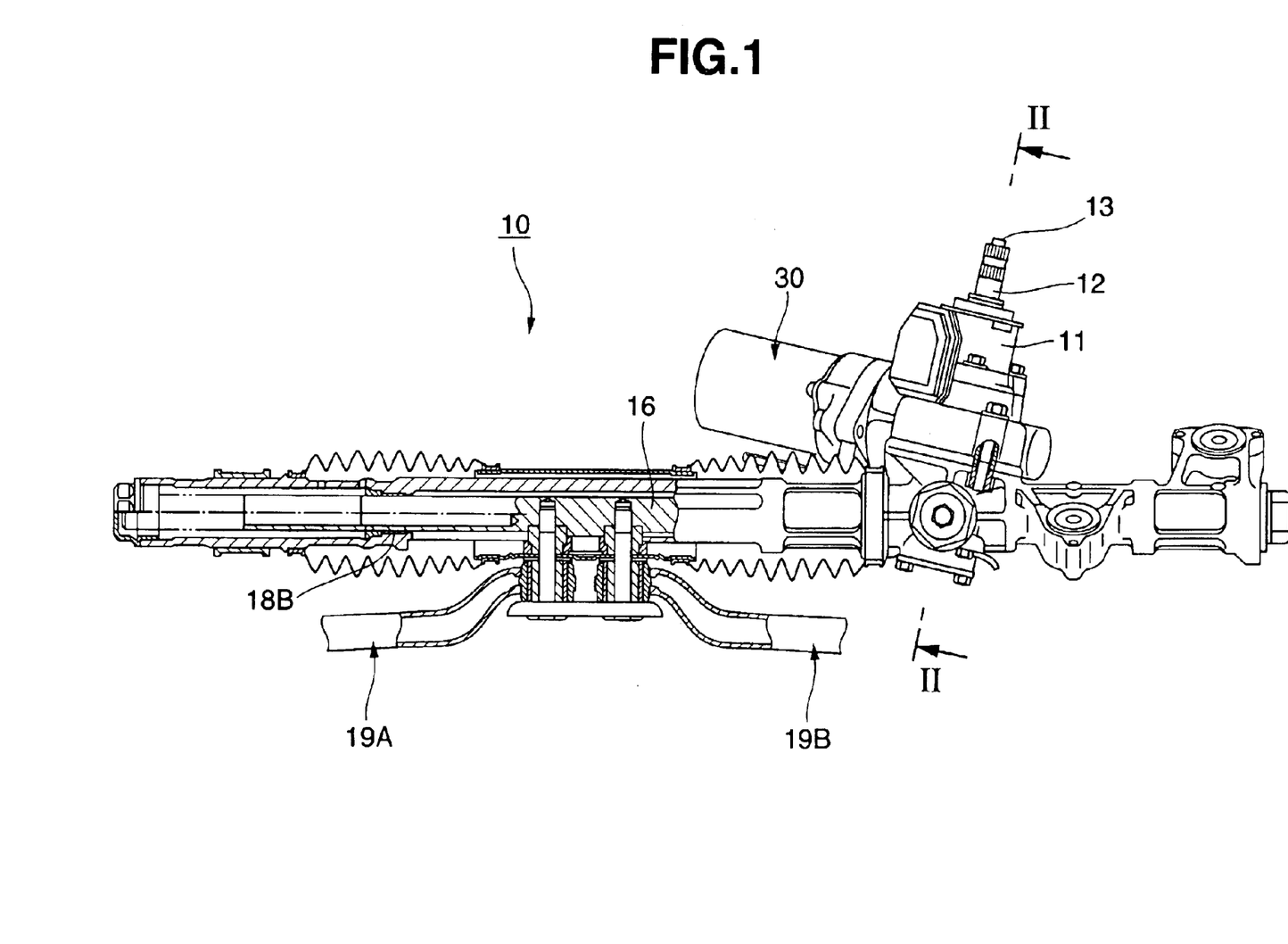
FIG. 1 is a front elevational view showing an electric power steering apparatus in a partly sectioned manner.
Figure 2:
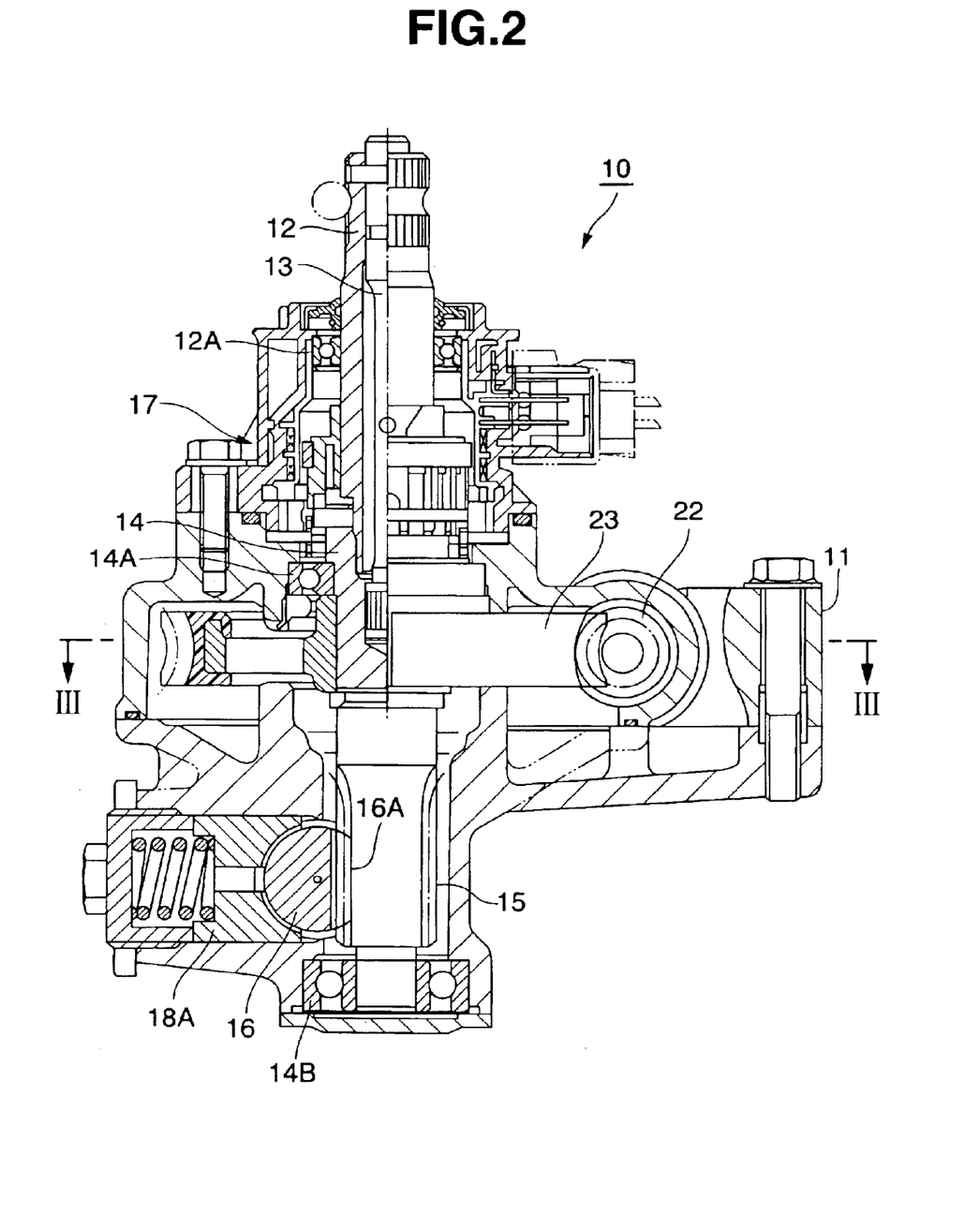
FIG. 2 is a cross sectional view along a line II—II in FIG. 1.

An electric power steering apparatus 10 has an aluminum alloy gear housing 11 fixed to a vehicle body frame or the like, as shown in FIGS. 1 and 2. Further, a pinion shaft 14 is connected via a torsion bar 13 to a steering shaft 12 to which a steering wheel is connected. A pinion 15 is provided in the pinion shaft 14, and a rack shaft 16 provided with a rack 16A engaged with the pinion 15 is supported to the gear housing 11 so as to freely move right and left. A steering torque detection apparatus 17 is provided between the steering shaft 12 and the pinion shaft 14. In this case, the steering shaft 12 and the pinion shaft 14 are supported to the gear housing 11 via bearings 12A, 14A and 14B. The rack shaft 16 is slidably supported to a rack guide 18A at one end and to a bearing 18B at another end. Further, left and right tie rods 19A and 19B are connected to a middle portion of the rack shaft 16.

Figure 3:
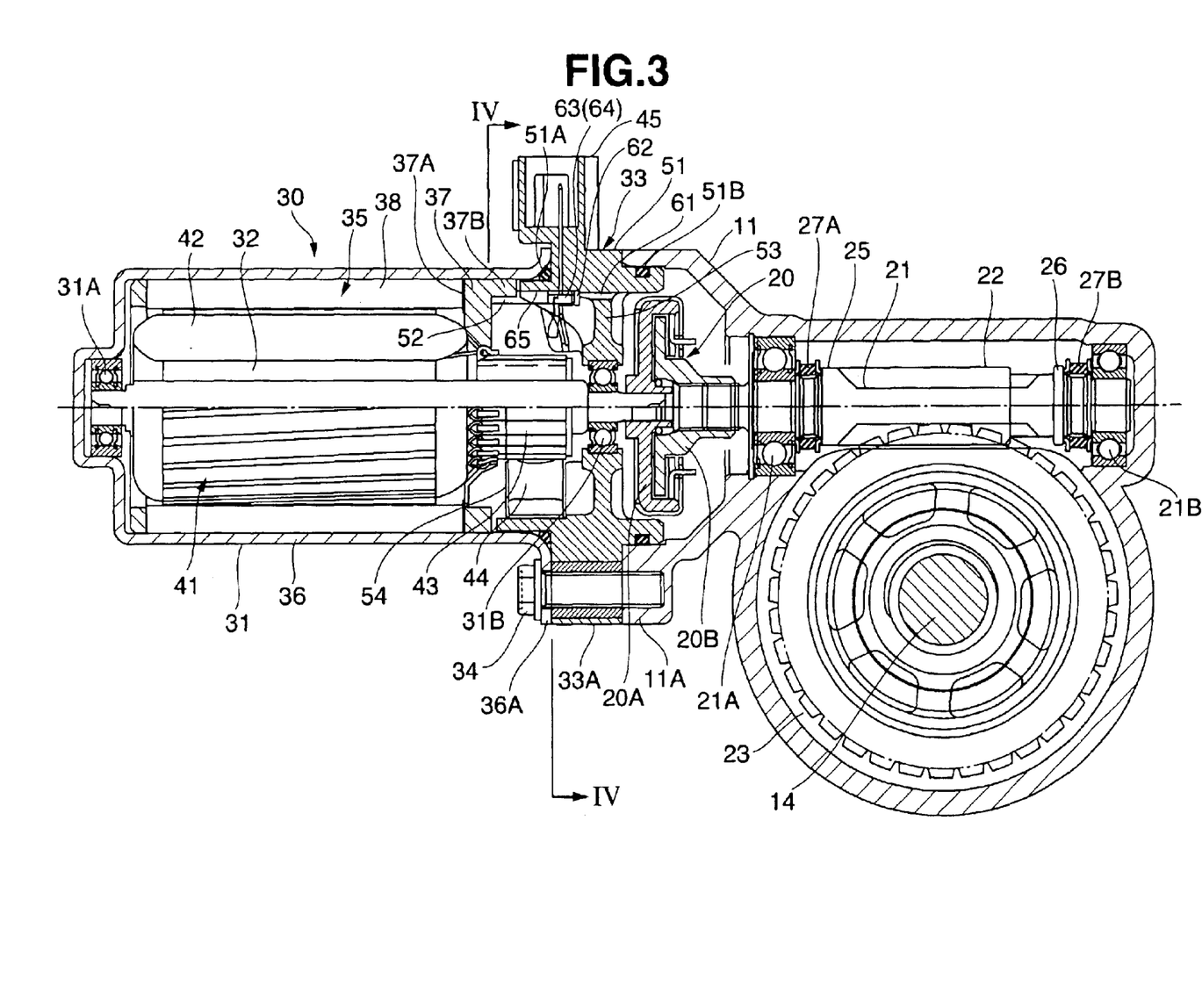
FIG. 3 is a cross sectional view along a line III—III in FIG. 2.

A motor case 31 of an electric motor 30 is fixed to the gear housing 11, as shown in FIG. 3, an assist shaft 21 is connected to a rotation shaft 32 of the electric motor 30 via a torque limiter 20, and the assist shaft 21 is supported to the gear housing 11 at both ends by bearings 21A and 21B such as a ball bearing or the like. Further, a worm gear 22 is integrally provided in a middle portion of the assist shaft 21, and a worm wheel 23 engaged with the worm gear 22 is fixed to a middle portion of the pinion shaft 14. A torque generated in the electric motor 30 is applied as a steering assist force to the rack shaft 16 via an engagement between the worm gear 22 and the worm wheel 23 and an engagement between the pinion 15 and the rack 16A, thereby assisting a steering force applied to the steering shaft 12 by a driver.

The torque limiter 20 is a friction plate type torque limiter including a connection body 20A connected to the rotation shaft 32 of the electric motor 30, and a connection body 20B connected to the assist shaft 21. Under normal torque conditions, a torque less than a limit torque, of the electric power steering apparatus 10, the rotation shaft 32 and the assist shaft 21 are continuously connected without slipping on the basis of a friction force of the torque limiter 20. In the case of an impact torque, equal to or larger than the limit torque, in which an inertia torque of the electric motor 30 overcomes the friction force of the torque limiter 20 when a stroke of the rack shaft 16 is suddenly stopped due to conditions such as running a tire on the curb, or the like, the rotation shaft 32 slips with respect to the assist shaft 21, whereby the torque limiter functions to prevent the torque of the electric motor 30 from being transmitted to a side of the assist shaft 21.

Further, the assist shaft 21 is elastically supported to the housing 11 bidirectionally in an axial direction, and can absorb an excessive thrust applied to the assist shaft 21, when the electric power steering apparatus 10 is reverse driven or the tire runs on a curb. In particular, outer rings of the bearings 21A and 21B for the assist shaft 21 are fixed to the gear housing 11, and the assist shaft 21 is loosely fitted to inner rings of the bearings 21A and 21B. Further, flanges 25 and 26 are provided in the assist shaft 21, a pre-compressed elastic deforming device 27A is interposed between the flange 25 and the inner ring of the bearing 21A, and a pre-compressed elastic deforming device 27B is interposed between the flange 26 and the inner ring of the bearing 21B. The elastic deforming devices 27A and 27B are assembled with a fixed pre-compressed amount (a fixed impact reducing performance) such that the elastic deforming devices 27A and 27B are loaded in the assist shaft 21, thereby elastically supporting the assist shaft 21 bidirectionally in the axial direction.

In this case, the electric motor 30 is structured as follows.

Figure 4:
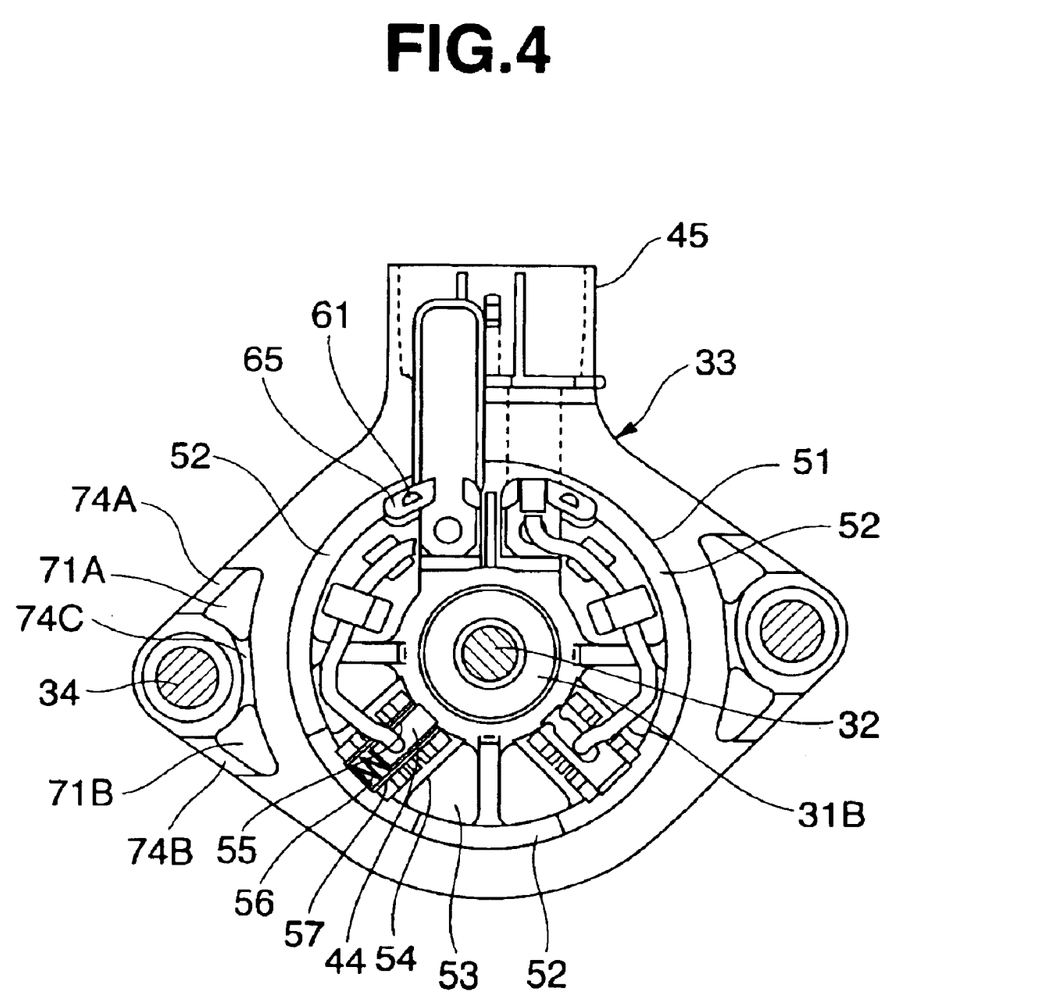
FIG. 4 is a view as seen from an arrow IV—IV in FIG. 3.

The electric motor 30 is structured, as shown in FIGS. 3 and 4, such that a motor case 31 and a brush holder 33 (FIGS. 5A to 5C) are fixed to the gear housing 11 by a bolt 34. The rotation shaft 32 is supported by bearings 31A and 31B constituted by a ball bearing or the like respectively provided in the motor case 31 and the brush holder 33. The electric motor 30 has a stator 35 which comprises a tubular yoke 36 constituting the motor case 31 and being formed from a magnetic material such as an iron or the like. A tubular magnet holder 37 (FIGS. 6A to 6C) forms magnet receiving sections 37A at a plurality of positions in a peripheral direction of an inner periphery of the yoke 36, formed by an insulative resin material. Magnets 38 are received in the magnet receiving sections 37A of the magnet holder 37 and are held in a positioned state. A magnet cover 39 (not shown) is press fit to an inner side of the magnet 38 held to be positioned in the magnet holder 37 and being formed by a nonmagnetic ultrathin plate.

The electric motor 30 has a rotor 41 which is inserted to an inner side of the stator 35 and which is fixed to the rotation shaft 32. The rotor 41 is constituted by an armature core 42 provided along an outer periphery of the rotation shaft 32 and a commutator 43.

The electric motor 30 has a brush 44 brought into contact with the commutator 43 of the rotor 41, a brush holder 33 holding the brush 44, and a feed connector 45 connected to the brush 44.

In the electric motor 30, when an electric current is fed to the armature core 42 from the brush 44 via the commutator 43 of the rotor 41, a line of magnetic force of the armature core 42 shuts off a magnetic field generated in the magnet 38 of the stator 35, whereby the rotor 41 is rotated.

Figure 5A:
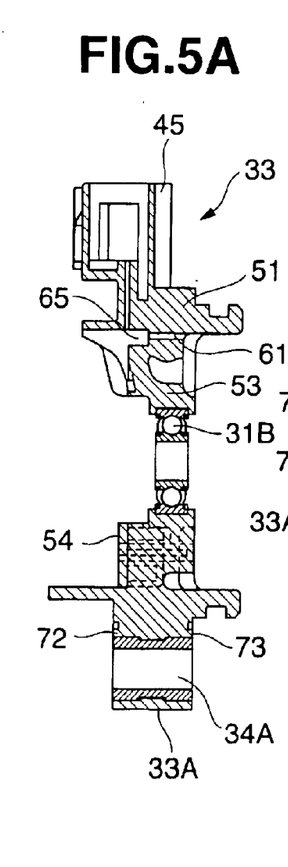
FIG. 5A is a cross sectional view.
Figure 5B:
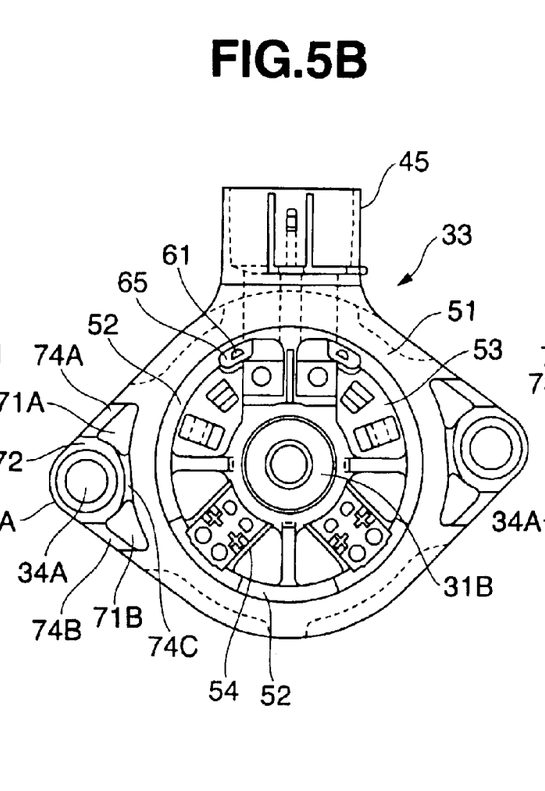
FIG. 5B is a left side elevational view.
Figure 5C:
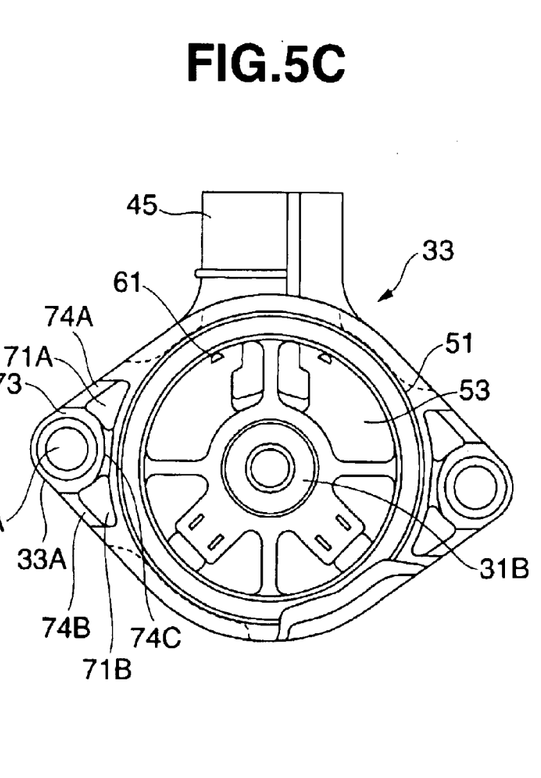
FIG. 5C is a right side elevational view.

Accordingly, the brush holder 33 is structured as shown in FIGS. 5A to 5C.

The brush holder 33 is an injection molded body integrally molded with the feed connector 45 and made of an insulative plastic material. The brush holder 33 is structured such that the yoke 36 (the motor case 31) is faucet connected to one end side of a short cylinder body 51 together with an O-ring 51A, and the gear housing 11 is faucet connected to another end side of the short cylinder body 51 together with an O-ring 51B. The brush holder 33 is clamped between the yoke 36 and the gear housing 11, and can coaxially connect three elements comprising the yoke 36, the brush holder 33 and the gear housing 11 by the bolt 34. In the brush holder 33, an engagement concave portion 52 is formed in a specified position in a peripheral direction (two positions in the present embodiment) in one end side of the short cylinder body 51. It is possible to prevent the brush 44 held by the brush holder 33 from being displaced from the magnet 38 of the stator 35 positioned by the magnet holder 37, by engaging a circular arch engagement convex portion 37B provided along an outer periphery on one end surface of the magnet holder 37 with the engagement concave portion 52. It is thereby possible to avoid rotation performance of the electric motor 30 from being different between the forward rotating direction and the backward rotating direction.

The brush holder 33 is provided with a partition wall 53 for partitioning the inner portion of the yoke 36 from the inner portion of the gear housing 11 in an inner portion of the short cylinder body 51, and is provided with the bearing 31B mentioned above. This comprises a ball bearing or the like for the rotation shaft 32 in a center portion of the partition wall 53 in accordance with an integral insert molding.

The brush holder 33 is provided with brush holding portions 54 in a plurality of positions, for example, two positions, in a peripheral direction on an end surface of the partition wall 53 facing the commutator 43. A case body 57 having a through hole 55 for slidably inserting the brush 44 is assembled in each of the brush holding body portions 54. The through hole 55 receives the brush 44 so as to slidably protrude to a side of the commutator 43, and holds the brush 44 in a positioned state. The brush holder 33 is additionally provided with a brush spring 56 which backup supports the brush 44 inserted to the through hole 55 and makes the brush 44 protrude from a leading end opening of the through hole 55 so as to push the brush 44 into contact with the commutator 43. In this case, FIG. 4 shows an assembled state in which the brush 44 and the brush spring 56 are assembled in one brush holding portion 54 of two brush holding portions 54, and only the brush 44 is assembled in the other one brush holding portion 54.

A description will be given below of (A) a venting structure of the electric motor 30, and (B) a drain structure of the brush holder 33.

(A) Venting structure of electric motor 30, FIG. 3, and FIGS. 6A to 6C:

The electric power steering apparatus 10 is provided with a hole-like communication passage 61 allowing the inner portion of the yoke 36 and the inner portion of the gear housing 11 to ventilate with each other, in the partition wall 53 of the brush holder 33, as shown in FIGS. 3, 4 and 5A to 5C. In the present embodiment, in the partition wall 53, the communication passages 61 passing through the partition wall 53 are provided in a plurality of positions, two positions in the present embodiment, in the peripheral direction along an inner periphery of the short cylinder body 51. When internal air of the yoke 36 changes temperature in correspondence to heating or cooling of the electric motor 30 as a result of the operation of the electric power steering apparatus 10, so as to be expanded or compressed, the communication passage 61 causes the inner portion of the yoke 36 and the inner portion of the gear housing 11 to ventilate therebetween. It is thereby possible to avoid dew condensation from being generated in the inner portion of the yoke 36.

Figure 6A:
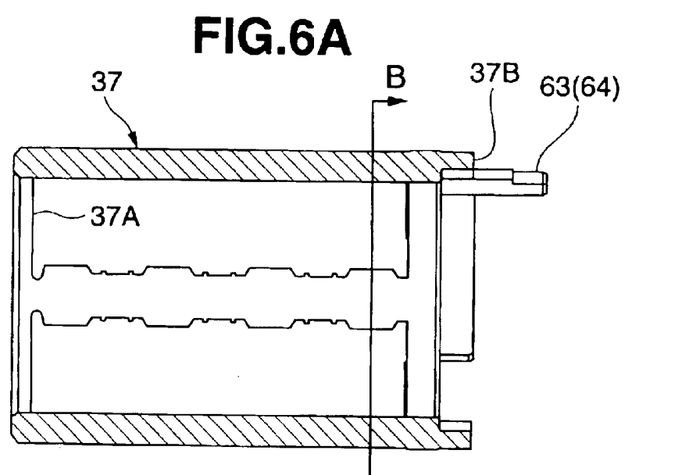
FIG. 6A is a cross sectional view.
Figure 6B:
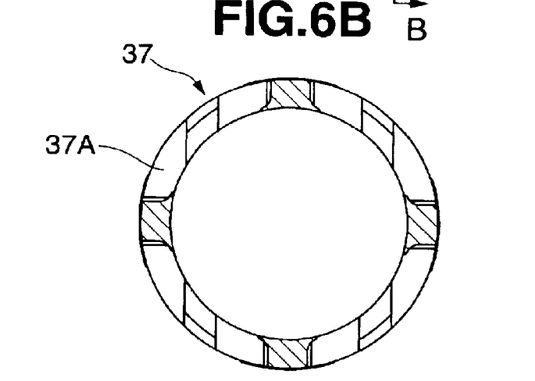
FIG. 6B is a cross sectional view along a line B—B in FIG. 6A.
Figure 6C:
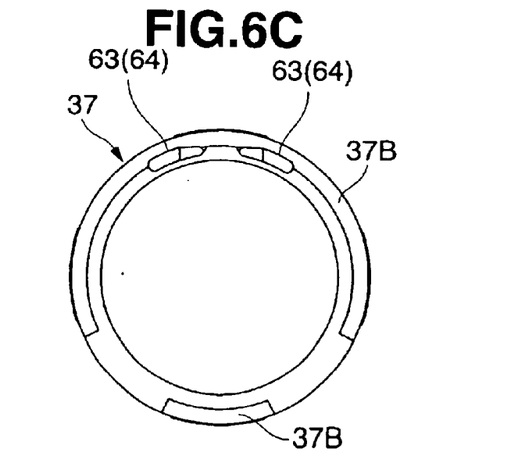
FIG. 6C is an end elevational view.

The electric motor 30 is provided with shielding means 63 opposing each other via a narrow passage 62 (FIG. 3), in an opening facing the inner portion of the yoke 36 in the communication passage 61 provided in the brush holder 33. In the present embodiment, the shielding means 63 is constituted by a shielding convex portion 64 formed on the end surface of the magnet holder 37 provided in the inner periphery of the yoke 36. The shielding convex portions 64 are provided in a protruding manner at a plurality of positions, two positions in the present embodiment, along the inner periphery of the circular arc engagement convex portion 37B of the magnet holder 37, as shown in FIGS. 6A to 6C. These shielding convex portions 64 are loosely inserted to loose insertion concave portions 65 provided in the positions which is along the engagement concave portion 52 formed in the short cylinder body 51 of the brush holder 33, and also where the communication passages 61 are open in the partition wall 53. The narrow passage 62 is formed between the shielding convex portion 64 and an opening in a bottom portion of the loose insertion concave portion 65.

In accordance with the present embodiment, since the venting structure of the electric motor 30 is provided as mentioned above, the following operations and effects can be achieved.

(1) The shielding means 63 opposes the opening facing the inner portion of the yoke 36 in the communication passage 61 provided in the brush holder 33 via the narrow passage 62. The inner and outer sides of the yoke 36 are communicated by the bent-shaped communication passage 61 and the passage 62. Accordingly, the shielding means 63 prevents foreign materials from passing without preventing air venting between the inner portion of the yoke 36 and the inner portion of the gear housing 11.

(2) Even in the case that grease applied to the peripheral portion of the assist shaft 21 in the inner portion of the gear housing 11 is scattered during operation of the electric power steering apparatus 10 in which the electric motor 30 is assembled in the gear housing 11, it is possible to prevent grease from making an intrusion into the inner portion of the yoke 36 of the electric motor 30 as a result of the existence of the shielding means 63.

(3) In the stage before the electric motor 30 is assembled in the gear housing 11, it is possible to prevent dust in the ambient air from intruding into the inner portion of the yoke 36 in the electric motor 30, as a result of the existence of the shielding means 63.

(4) Since the shielding means 63 is constituted by the convex portion 64 formed on the end surface of the magnet holder 37, the number of parts is not increased and the assembly can be simplified.

(5) Where the brush holder 33 is correctly assembled in the yoke 36 of the electric motor 30, it is possible to observe a condition in which the communication passage 61 of the brush holder 33 is shielded by the convex portion 64 of the magnet holder 37, from a side of an outer surface of the brush holder 33. Accordingly, it is possible to easily inspect whether or not an assembly fault exists.

In this case, the shielding means 63 is not limited to the structure integrally provided in the yoke 36, and may be integrally provided in the brush holder 33. Further, the shielding means 63 may be structured by another part assembled in the brush holder 33, the yoke 36, the magnet holder 37 or the like.

Figure 7:
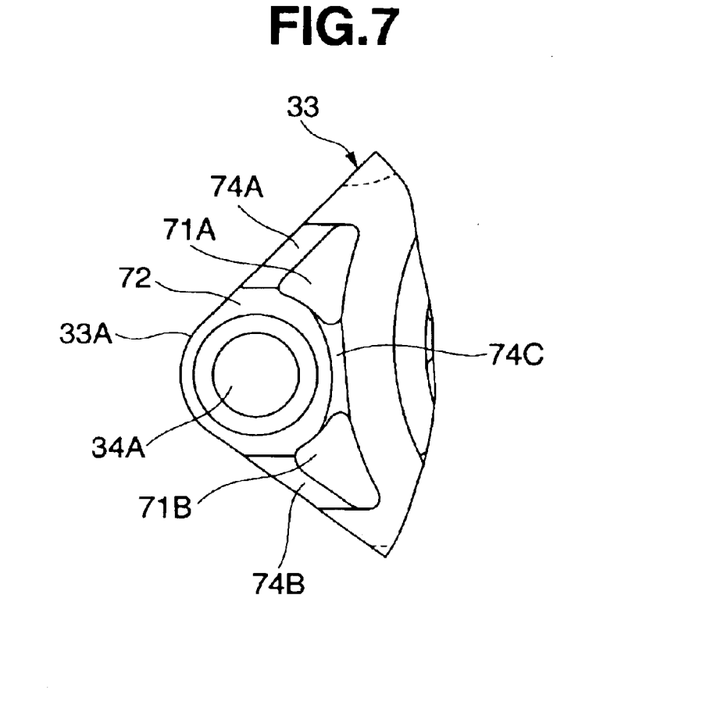
FIG. 7 is an enlarged view showing a flange of the brush holder.
Figure 8:
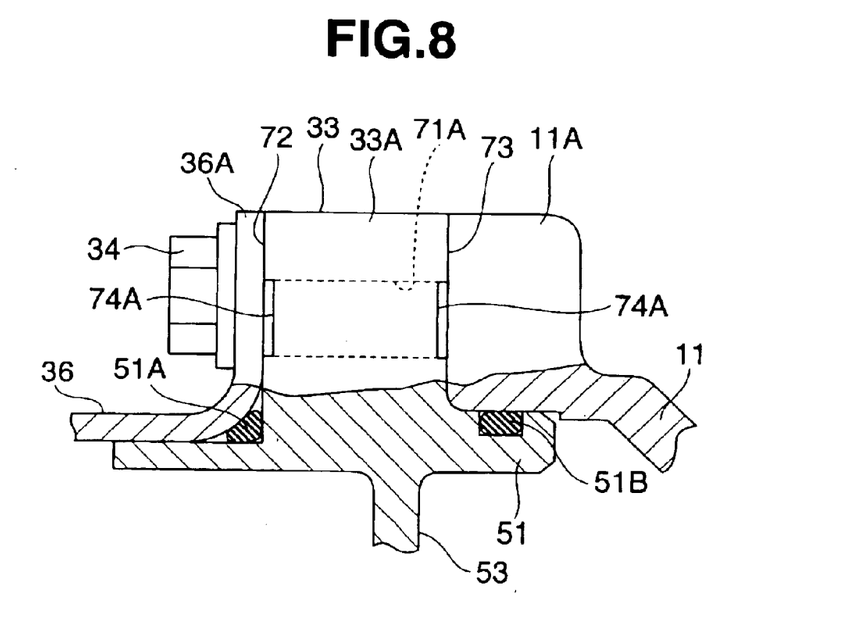
FIG. 8 is a front elevational view showing a state in which the flange of the brush holder is clamped between a yoke and a housing.

(B) Drain structure of brush holder 33, FIGS. 7 and 8:

The electric power steering apparatus 10 is structured such that a flange 33A of the brush holder 33 is clamped between a flange 36A of the yoke 36 of the electric motor 30 and a flange 11A of the gear housing 11 (FIG. 8), and these three elements are fixed by the bolt 34 as mentioned above. The brush holder 33 is a plastic molded product. In the brush holder 33, two casted holes 71A and 71B are formed adjacently in two positions in the vicinity of a bolt insertion hole 34A in the flange 33A. This achieves a weight saving of the brush holder 33 and inhibits compression deformation when forming the brush holder 33 so as to improve accuracy in the formability of the flange 33A. This secures flatness of a flange surface 72 which is in contact with the yoke 36 and a flange surface 73 which is in contact with the gear housing 11, and the like.

The casted holes 71A and 71B pass through the flange surface 73 which is in contact with the gear housing 11 from the flange surface 72 which is in contact with the yoke 36, in the flange 33A.

The flange 33A of the brush holder 33 has communication passages 74A and 74B which are respectively extended to both side outer peripheral surfaces holding both casted holes 71A and 71B therebetween from both the casted holes 71A and 71B. The casted holes 71A and 71B are communicated with an external space of the electric power steering apparatus 10 by the communication passages 74A and 74B, so as to be opened. The flange 33A is provided with a sub communication passage 74C communicating both the casted holes 71A and 71B with each other.

The communication passage 74A is provided in a concave manner in each of the flange surface 72 which is in contact with the yoke 36 of the flange 33A and the flange surface 73 which is in contact with the gear housing 11, and is formed in a groove shape extending from an outer edge of the flange 33A to an open edge of the casted hole 71A. The communication passage 74B is provided in a concave manner in each of the flange surface 72 which is in contact with the yoke 36 of the flange 33A and the flange surface 73 which is in contact with the gear housing 11, and is formed in a groove shape extending from the outer edge of the flange 33A to an open edge of the casted hole 71B. The communication passage 74C is provided in a concave manner in each of the flange surface 72 which is in contact with the yoke 36 of the flange 33A and the flange surface 73 which is in contact with the gear housing 11, and is formed in a groove shape extending from the opening edge of the casted hole 71A to the open edge of the casted hole 71B. In this case, the communication passages 74A to 74C may be formed in a hole shape which is pierced in both the casted holes 71A and 71B in the inner portion of the flange 33A.

Accordingly, water intruding into the casted hole 71A from the gap between the flange 33A of the brush holder 33, and the yoke 36 and the gear housing 11 during use of the electric power steering apparatus 10 is directly drained from the communication passage 74A to the external portion, or is drained to the external portion from the communication passage 74B via the sub communication passage 74C. Further, water intruding into the casted hole 71B is directly drained from the communication passage 74B to the external portion, or is drained to the external portion from the communication passage 74A via the sub communication passage 74C.

In accordance with the present embodiment, since the drain structure of the casted holes 71A and 71B in the brush holder 33 is provided in the manner mentioned above, the following operations and effects can be achieved.

(1) The casted holes 71A and 71B provided in the flange 33A of the brush holder 33 are communicated with the external portion by the communication passages 74A to 74C provided in the flange 33A. Accordingly, water intruding into the casted holes 71A and 71B from the gap between the yoke 36 and the flange 33A, or the gap between the gear housing 11 and the flange 33A, is drained to the external portion from the communication passages 74A to 74C, and does not stay in the casted holes 71A and 71B. Accordingly, it is possible to prevent the water residing in the inner portions of the casted holes 71A and 71B from freezing, and it is possible to prevent the yoke 36 and the gear housing 11 from being corroded by the water.

(2) The communication passages 74A to 74C communicating the casted holes 71A and 71B with the external portion in the item (1) mentioned above are formed by the grooves provided in a concave manner in the flange surfaces 72 and 73, which are respectively in contact with the yoke 36 of the flange 33A and the gear housing 11. In this manner, the communication passages 74A to 74C can be easily molded.

(3) When forming two casted holes 71A and 71B adjacently in the flange 33A of the brush holder 33, the communication passages 74A and 74B extending to both side outer portions holding both the casted holes 71A and 71B therebetween are respectively extended from both the casted holes 71A and 71B. A sub communication passage 74C communicating both the casted holes 71A and 71B with each other is provided. Accordingly, the communication passages of the casted holes 71A and 71B do not form a dead end passage on the flange surfaces 72 and 73, and the casted holes 71A and 71B are open to the outer portions in both upper and lower sides of the flange 33A. The water intruding into one casted hole 71A does not stay in the dead end passage. This water is drained from the communication passage 74A extending to the external portion from the casted hole 71A, or from the communication passage 74B extending to the external portion from the casted hole 71A via the sub communication passage 74C. Further, water intruding into another casted hole 71B does not stay in the dead end passage. This water is drained from the communication passage 74B extending to the external portion from the casted hole 71B, or from the communication passage 74A extending to the external portion from the casted hole 71B via the sub communication passage 74C. Accordingly, water intruding into the casted holes 71A and 71B is drained irrespective of the mounting manner of the electric power steering apparatus 10.

As heretofore explained, embodiments of the present invention have been described in detail with reference to the drawings. However, the specific configurations of the present invention are not limited to the illustrated embodiments but those having a modification of the design within the range of the present claimed invention are also included in the present invention.

In accordance with the present invention, in the electric power steering apparatus in which the communication passage allowing the inner portion of the yoke in the electric motor and the inner portion of the housing to be ventilated is provided in the partition wall of the brush holder, it is possible to prevent foreign materials from making an intrusion into the inner portion of the electric motor.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. An electric power steering apparatus comprising:
   a yoke of an electric motor fixed to a housing;
   an assist shaft of a steering apparatus supported to the housing, the assist shaft being connected to a rotation shaft of the electric motor;
   a brush holder of the electric motor clamped between the yoke of the electric motor and the housing; and
   a communication passage allowing an inner portion of the yoke in the electric motor and an inner portion of the housing to be ventilated, the communication passage being provided in a partition wall of the brush holder, and
   shielding means opposing each other are provided in an opening facing the inner portion in a side of the yoke in the communication passage arranged in the brush holder, via a narrow passage.

2. The electric power steering apparatus according to claim 1, wherein the shielding means is a convex portion formed on an end surface of a magnet holder provided in an inner periphery of the yoke.

3. The electric power steering apparatus according to claim 1, wherein the brush holder has a short cylinder body, and the yoke, the brush holder and the housing are coaxially connected by a faucet connecting the yoke to one end side of the short cylinder body, and a faucet connecting the housing to another end side of the short cylinder body.

4. The electric power steering apparatus according to claim 3, wherein an engagement concave portion is formed in a specified position in a peripheral direction in one end side of the short cylinder body of the brush holder, and a circular arc engagement convex portion provided along an outer periphery on one end surface of the magnet holder is engaged with the engagement concave portion.

5. The electric power steering apparatus according to claim 3, wherein the communication passages are provided at a plurality of positions in a peripheral direction of the brush holder along an inner periphery of the short cylinder body so as to pass through the partition wall.

6. The electric power steering apparatus according to claim 4, wherein convex portions formed on an end surface of the magnet holder are provided in a protruding manner at a plurality of positions of the magnet holder along an inner periphery of the circular arc engagement convex portion, and are loosely inserted to loose insertion concave portions provided at positions along an engagement concave portion formed in the short cylinder body of the brush holder and positions to which the communication passage is open in the partition wall of the brush holder, and the narrow passage is provided between an opening in a bottom portion of the loose insertion concave portion and the convex portion.

7. The electric power steering apparatus according to claim 1, wherein the shielding means are integrally provided in the yoke.

8. The electric power steering apparatus according to claim 2, wherein the shielding means are integrally provided in the yoke.

9. The electric power steering apparatus according to claim 1, wherein the shielding means are integrally provided in the brush holder.

10. The electric power steering apparatus according to claim 2, wherein the shielding means are integrally provided in the brush holder.

* * * * *